(12) United States Patent
Behin et al.

(10) Patent No.: US 6,962,830 B1
(45) Date of Patent: Nov. 8, 2005

(54) GLOBAL MECHANICAL STOP

(75) Inventors: Behrang Behin, Berkeley, CA (US); Kam Yin Lau, Danville, CA (US); Richard S. Muller, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/511,428

(22) Filed: Feb. 23, 2000

Related U.S. Application Data
(60) Provisional application No. 60/123,496, filed on Mar. 9, 1999.

(51) Int. Cl.[7] .............................................. H01L 21/00
(52) U.S. Cl. .......................... 438/50; 438/52; 257/443; 257/444; 257/462
(58) Field of Search ................................ 257/434, 435, 257/436, 443, 444, 462; 438/50, 52

(56) References Cited

U.S. PATENT DOCUMENTS

| | | | |
|---|---|---|---|
| 4,580,873 A | * | 4/1986 | Levinson ..................... 350/96.2 |
| 5,724,015 A | | 3/1998 | Tai et al. ....................... 335/78 |
| 5,774,604 A | | 6/1998 | McDonald ..................... 385/18 |
| 5,945,898 A | * | 8/1999 | Judy et al. ..................... 335/78 |
| 6,137,926 A | | 10/2000 | Maynard |
| 6,201,629 B1 | * | 3/2001 | McClelland et al. ......... 359/223 |
| 6,332,573 B1 | * | 12/2001 | Gu et al. ............... 235/462.06 |
| 6,351,577 B1 | * | 2/2002 | Askyuk et al. ................. 385/15 |
| 2001/0022682 A1 | * | 9/2001 | McClelland et al. ......... 359/280 |
| 2002/0021860 A1 | * | 2/2002 | Ruan et al. ..................... 385/18 |

OTHER PUBLICATIONS

Toshiyoshi et al., "Electrostatic Micro Torsion Mirrors for an Optical Switch Matrix", J. of Microelectromechanical Systems, vol. 5, No. 4, Dec. 1996, 231–237.

L. Y. Lin et al "Free–Space Micromachined Optical Switches with Submillisecond Switching Time for Large–Scale Optical Crossconnects," IEEE Photonics Technology Letters, US, IEEE Inc. New York, vol. 10, No. 4, Apr. 1, 1998, pp. 525–527, XP00075414, ISSN: 1041–1135.

K Y Lau "MEM's the Word for Optical Beam Manipulation", IEEE Circuits and Devices Magazine, IEEE Inc. New York; US, vol. 13, No. 4, Jul. 1997, pp. 11–18, XP000831634, ISSN: 8755–3996, figures 1, 2, 14.

Jaecklin V P et al: "Mechanical and Optical Properties of Surface Micromachined Torsional Mirrors in Silicon, Polysilicon and Aluminum" Sensors and Actuators A, Ch, Elsevier Sequoia, S.A., Luassane, vol. A43, No. 1/03, May 1, 1994, pp. 269–275, XP000454122, ISSN: 0924–4247.

V. P. Jaecklin, et al., "Optical Microshutters and Torsional Micromirrors for Light Modulator Arrays", IEEE, pp. 124–127 (1993).

* cited by examiner

*Primary Examiner*—Long Pham
*Assistant Examiner*—Wai-Sing Louie
(74) *Attorney, Agent, or Firm*—Fish & Richardson P.C.

(57) ABSTRACT

Microstructure apparatus and methods are described. An exemplary movable microstructure apparatus includes a base, a plate, and a stop. The plate may be coupled to the base through a flexure, so that the plate is movable between a first angular orientation and a second angular orientation. The stop may be configured to contact the bottom portion of the plate in a contact area when the plate is in the second angular orientation. Alternatively, the stop may be configured to contact the plate in a contact area sized so that upon application of an electrostatic bias between the plate and the stop, a sufficient force holds the plate against the stop. Alternatively, the stop may have a substantially planar surface configured to contact the plate in a contact area sized so that, upon application of a force to the plate substantially normal to the substantially planar surface of the stop, a sufficient force holds the plate against the stop such that the plate lies in a plane substantially parallel to the substantially planar surface of the stop.

43 Claims, 7 Drawing Sheets (top view)

(side view)

(side view)

(front view)

(top view)

GLOBAL MECHANICAL STOP

CROSS REFERENCE TO RELATED APPLICATIONS

This application claims the benefit of prior U.S. Provisional Application Ser. No. 60/123,496, filed Mar. 9, 1999. +gi

STATEMENT AS TO FEDERALLY SPONSORED RESEARCH

This invention was made with Government support under Grant No. DABT 63-95-C-0055, which was awarded by the Defense Advanced Research Projects Agency (DARPA). The Government has certain rights in this invention.

BACKGROUND OF THE INVENTION

The present invention relates to movable microstructure methods and apparatus. Movable microstructures may be used in many different applications. For example, certain movable microstructures may be used to implement large-port-count optical crossbar switches which facilitate the flow of data over a computer network (e.g., the Internet).

The explosive growth of internet traffic in the last few years, and its unabated continuation into the foreseeable future, has created an unprecedented demand on the communication infrastructure of both long distance and interchange carriers. The term "fiber exhaust" was coined in the last few years to describe the saturation of traffic in the present installed base of optical fibers. Thus ushered in the era of wavelength division multiplex (WDM), a technique for using multiple colors of light inside a single strand of fiber in order to boost the capacity of the fiber manifold without actually having to install any new fibers. But as internet traffic continues to grow, the fiber-optic network infrastructure is encountering another bottleneck which WDM or similar solutions cannot solve. Interconnection between the growing number of channels supported by WDM systems demands solutions based on optical-cross-connects (OXCs). Large-port-count optical crossbar switches promise to be key components for performing OXC functions.

An optical crossbar switch can provide interchange of data paths between different fibers, at multi-gigabit data rates, without having to first convert them into the electronic domain as is being done in existing networks. An N×N optical crossbar switch consists of N input and N output optical fiber ports, with the capability of selectively directing light from any input port to any output port in a "non-blocking" fashion. Currently, switches deployed in the communication infrastructure operate by converting the input optical signals to electronic signals, directing the electronic signals to the proper output channels, and converting them back into optical signals. In an all-optical OXC, the light is directly deflected from an input fiber port into an output fiber port without any electrical conversion. Each of the optical beams can be expanded and collimated by inserting a microlens at the tip of each input and output fiber port. By propagating an array of optical beams in free space and selectively actuating reflectors in an array of movable reflectors, any one of the N input optical beams can be directed to any one of the N output fibers ports. The core of each input and output fiber port is the region in which most of the optical et beam travels. Due to the small diameter of the core, the optical crossbar switch requires the reflectors to be maintained at a precise position in order to direct each optical beam from one fiber port to another.

The optical crossbar switch has several inherent advantages over its electronic counterpart, including data rate, format, wavelength independence, and lower costs. Furthermore, with advances in microelectromechanical systems (MEMS) technology, batch-processing and assembly methods similar to those used in the IC industry can be employed to produce optical crossbar switches with high port-counts at very low costs.

SUMMARY OF THE INVENTION

In one aspect, the invention features a movable microstructure apparatus comprising a base, a plate having a bottom portion coupled to the base so that the plate is movable between a first angular orientation and a second angular orientation, and a stop configured to contact the bottom portion of the plate in a contact area when the plate is in the second angular orientation.

In another aspect, the invention features a movable microstructure apparatus comprising a base, a plate coupled to the base and movable between a first angular orientation and a second angular orientation, and a stop configured to contact the plate in a contact area sized so that, upon application of an electrostatic bias between the plate and the stop, a sufficient force holds the plate against the stop.

Embodiments may include one or more of the following features.

The plate can be coupled to the base at an anchor location. The plate can be coupled to the base through a flexure. The flexure may be formed from a flexible and resilient material accommodating changes in the angular orientation of the plate about the anchor location with respect to the first angular orientation, and a lateral position of the plate with respect to the anchor location. The plate and the stop may each comprise a respective electrically conductive portion. The flexure may be electrically conductive such that the plate can be set to ground or a voltage potential. Upon application of a magnetic field, the plate may move to the second angular orientation and contact the stop in a contact area characterized by a height b and width w that effectively satisfies the following condition:

$$\frac{\varepsilon w V^2}{2g^2} \times \frac{b^2 + 2ab}{2} \geq k_\theta \theta \qquad (1)$$

where $\varepsilon$ is a constant representing the permittivity of a material separating the electrically conductive portion of the plate and the electrically conductive portion of the stop when the plate is in contact with the stop, V is a voltage applied to create an electrostatic bias between the plate and the stop, g is a distance separating the electrically conductive portion of the plate and the electrically conductive portion of the stop when the plate is in contact with the stop, $k_\theta$ is a torsional spring constant of the flexure, $\theta$ is the angular orientation of the plate about the anchor location with respect to the first angular orientation, and a is a distance separating the stop and the base. If the second angular orientation is an obtuse angle about the anchor location with respect to the first angular orientation, the plate may move to the second angular orientation and contact the stop in a contact area characterized by a height b and a width w provided two conditions are satisfied: (i) condition 1 defined above; and (ii) the following condition:

$$\frac{\varepsilon w V^2}{2g^2} \times \frac{b^2}{2} \geq kd(a+b) \quad (2)$$

where k is a lateral spring constant of the flexure, and d is a distance separating the anchor location and a plane defined by the contact area of the stop. Alternatively, if the second angular orientation is an acute angle about the anchor location with respect to the first angular orientation, the plate may move to the second angular orientation and contact the stop in a contact area characterized by a height b and a width w provided two conditions are satisfied: (i) condition 1 defined above; and (ii) the following condition:

$$\frac{\varepsilon w V^2}{2g^2} \times \frac{b^2}{2} \geq kda \bigg) \quad (3)$$

where k is a lateral spring constant of the flexure, and d is a distance separating the anchor location and a plane defined by the contact area of the stop.

The flexure may be formed from polycrystalline-silicon and may include but not be limited to torsional, serpentine, cantilever, and combination of pin-and-staple rotational hinges and/or hinges and flexures having lateral compliance. The flexure may pull the plate from a second angular orientation to a first angular orientation when the electrostatic force coupling the stop and plate is released. The contact area may comprise a substantially planar surface configured to define a lateral position of the plate with respect to an anchor location and the second angular orientation of the plate about the anchor location with respect to the first angular orientation when a force is applied between the plate and the stop. The contact area may also generally comprise the overlap area of the plate and the stop where textured surfaces are used to prevent sticking effects of substantially planar surfaces. The substantially planar contact area surface may be substantially perpendicular to a top surface of the base. The force may be an electrostatic force. The base, the plate and the stop may be formed from a semiconductor material. The plate may have a current-carrying coil, a hard magnetic material, a soft magnetic material, or a combination of the three. The plate may have a light-reflecting surface. The plate may be one of an array of plates coupled to the base, each plate having a respective stop configured to contact the plate in a contact area. The respective stops may be formed from or be part of a single global mechanical stop array.

In another aspect, the invention features a movable microstructure apparatus comprising a base, a plate coupled to the base and movable between a first position and a second position, and a stop having a substantially planar surface configured to contact the plate in a contact area sized so that, upon application of a force to the plate substantially normal to the substantially planar surface of the stop, a sufficient force holds the plate against the stop such that the plate lies in a plane substantially parallel to the substantially planar surface of the stop.

In yet another aspect, the invention features a method for directing an optical beam from a first port to a second port. The method comprises applying a first force to a plate to move the plate from a first angular orientation to a second angular orientation, wherein the plate contacts a stop in the second angular orientation, and applying a second force between the plate and the stop to hold the plate against the stop in a plane substantially parallel to a substantially planar surface of the stop, such that the plate directs an optical beam from a first port to a second port. The first force may be a magnetic field; the second force may be an electrostatic bias.

In yet another aspect, the invention features a method for directing an optical beam from a first port to a second port using a light-reflective plate having a first angular orientation in the absence of an applied force and a static equilibrium position in the presence of a steady force. The method comprises applying a first force to the plate to move the plate from the first angular orientation to a second angular orientation other than the static equilibrium position, wherein the plate contacts a stop in the second angular orientation, and applying a second force between the plate and the stop to hold the plate against the stop in a plane substantially parallel to a substantially planar surface of the stop, such that the plate directs an optical beam from a first port to a second port.

Embodiments may include one or more of the following features.

The first force may be a time-varying force. The first force may have a profile selected from a group consisting of a step profile, a ramp profile, a sinusoidal profile, and a pulse profile. The first force may be a magnetic field. The second force may be an electrostatic bias.

In yet another aspect, the invention features a method for manufacturing an apparatus for directing optical beams. The method comprises coupling an array of plates to a base assembly, each plate being movable between a first angular orientation and a second angular orientation, and forming an array of apertures in a stop assembly, the stop assembly being coupled to the base assembly, and each aperture being positioned to contact its respective plate when the plate is in the second angular orientation.

Embodiments may include one or more of the following features.

Each aperture may be constructed to have at least one substantially planar sidewall constructed to lie in a plane orthogonal to a top surface of the base assembly. Each plate may be coupled to the base assembly through at least one flexure.

Advantages that can be seen in implementations of the invention include one or more of the following. The invention can produce an optical crossbar switch having very low insertion loss. The precise positioning of the reflectors enabled by the invention can be used in applications that integrate micro-optical elements, for example, lasers, lenses, movable reflectors and beam splitters, on a silicon chip.

The details of one or more embodiments of the invention are set forth in the accompanying drawings and the description below. Other features and advantages of the invention will become apparent from the following description, including the drawings and the claims.

BRIEF DESCRIPTION OF THE DRAWINGS

FIG. 6b is a diagrammatic top view of the N×M system movable microstructure apparatus of FIG. 6a.

DETAILED DESCRIPTION

Figure 1:
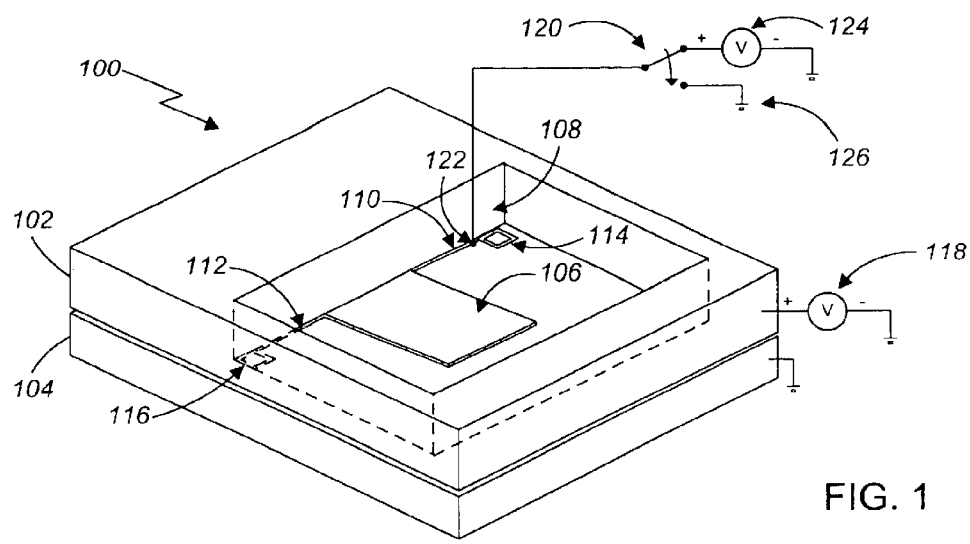
FIG. 1 is a diagrammatic perspective view of a movable microstructure apparatus.

FIG. 1 shows an apparatus 100 having a stop 102, a base 104 and a plate 106. The plate 106 is coupled to the base 104 and is movable between a first angular orientation and a second angular orientation. The stop 102 has at least one substantially planar sidewall 108 that is configured to contact the plate 106 in a contact area when the plate 106 is in the second angular orientation. In one implementation, a substantially planar sidewall 108 is constructed to lie in a plane which is orthogonal to the top surface of the base 104.

The apparatus 100 is fabricated by a MEMS process. The base 104 may be composed of an insulating layer disposed over a semiconductor substrate; for example, silicon nitride, silicon oxide, or a combination of both, may be disposed over a silicon substrate. The plate 106 may be a rectangular beam formed from a conductive material or a semiconductive material such as polycrystalline silicon. A layer of magnetic material may be plated onto the plate 106. More than one region of the plate 106 may be so plated. The magnetic material may be one of various combinations of nickel, iron, or other elements, and is usually ferromagnetic characterized by a high saturation magnetization.

Figure 2A:
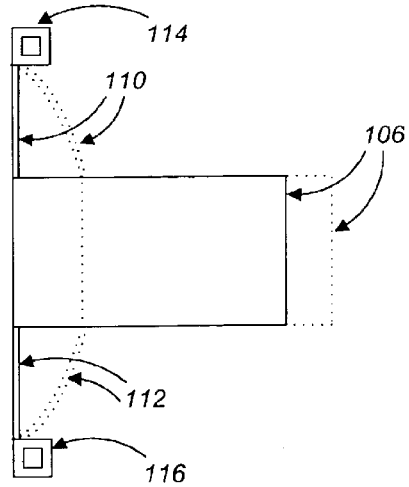
FIG. 2a is a diagrammatic top view of a movable microstructure apparatus having a different lateral position with respect to an anchor location and a different angular orientation about an anchor location with respect to a first angular orientation.
Figure 2B:
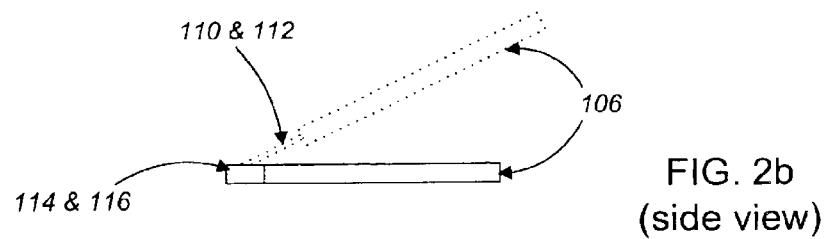
FIG. 2b is a diagrammatic side view of a movable microstructure apparatus having a different lateral position with respect to an anchor location and a different angular orientation about an anchor location with respect to a first angular orientation.

The plate 106 may be coupled through flexures 110 and 112 to the base 104 at anchor locations. In one implementation, insulative anchors 114 and 116 are used to attach the flexures 110 and 112 to the base 104. The flexures 110 and 112 may be formed from a flexible and resilient conductive or semiconductive material (e.g., polycrystalline silicon). The flexible material provides the flexures 110 and 112 with a degree of elasticity. The flexures 110 and 112 allow the plate 106 to change its angular orientation about the anchors 114 and 116 with respect to the first angular orientation and its lateral position with respect to the anchors 114 and 116, as shown in FIGS. 2a and 2b.

In one implementation, the stop 102 is coupled to a voltage source 118 and the base 104 is electrically grounded. An electrostatic clamping circuit can be formed from a switch 120, a contact 122 for forming a connection between the switch 120 and the flexure 110, the plate 106, the flexure 112, and the anchor 116, and is switchable between a voltage source 124 and electrical ground 126. The voltage sources 118 and 124 may be external sources such as power supplies or batteries, or internal sources on the apparatus 100. An electrostatic bias can be created between the plate 106 and one of the clamping surfaces (base 104 and stop 102) depending on the position of the switch 120.

Figure 3A:
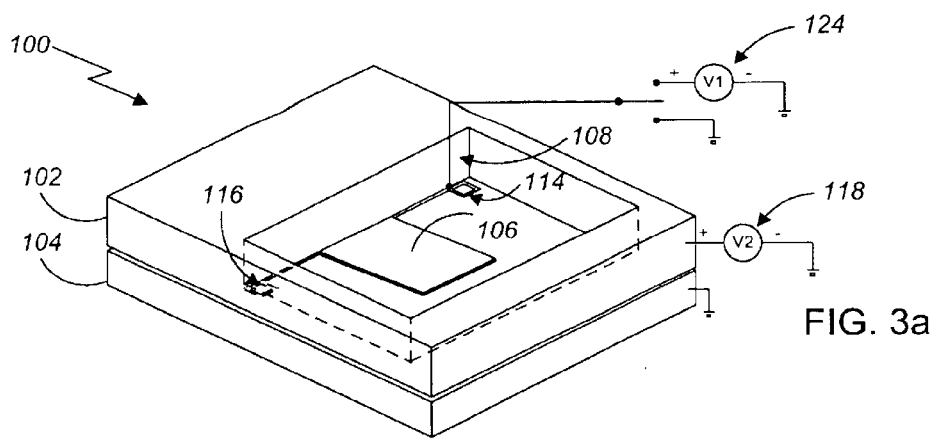
FIGS. 3a–3f are diagrammatic perspective views of the movable microstructure apparatus of FIG. 1 upon application of various combinations of a magnetic field and an electrostatic bias.
Figure 3B:
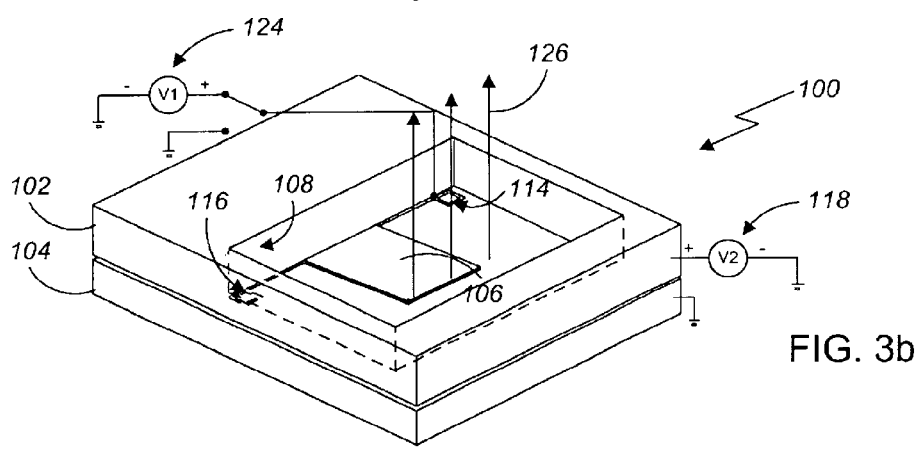
Figure 3C:
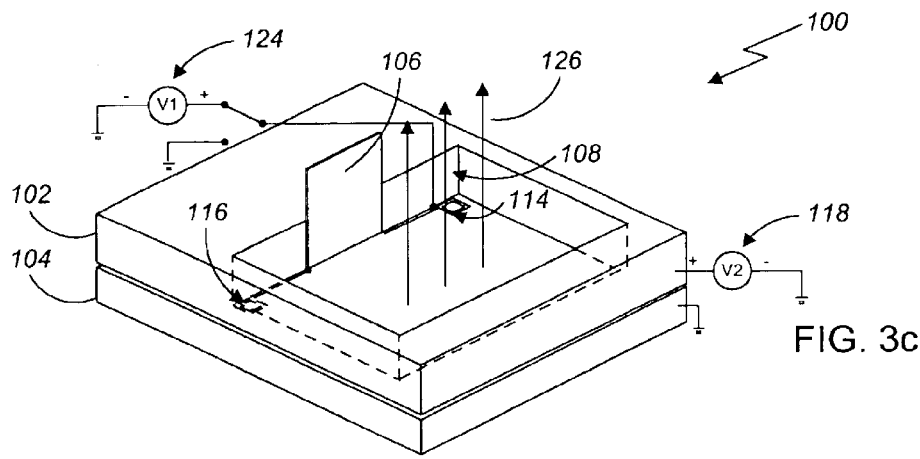
Figure 3D:
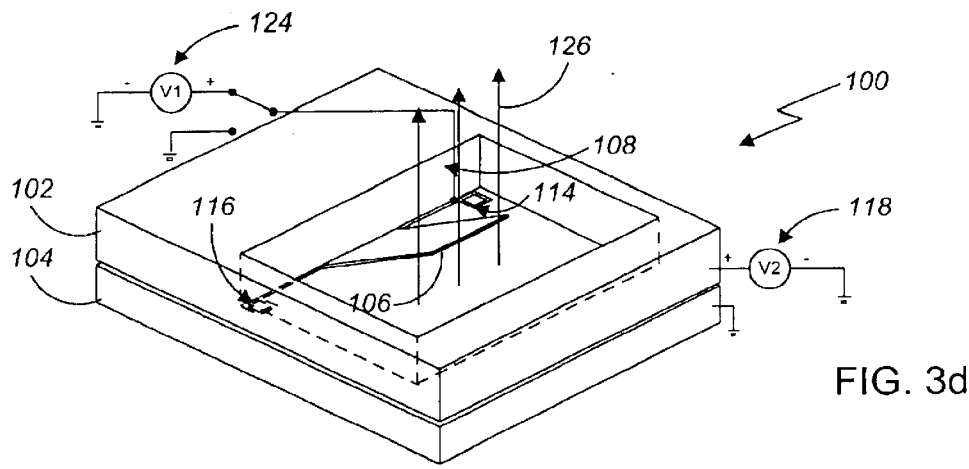
Figure 3E:
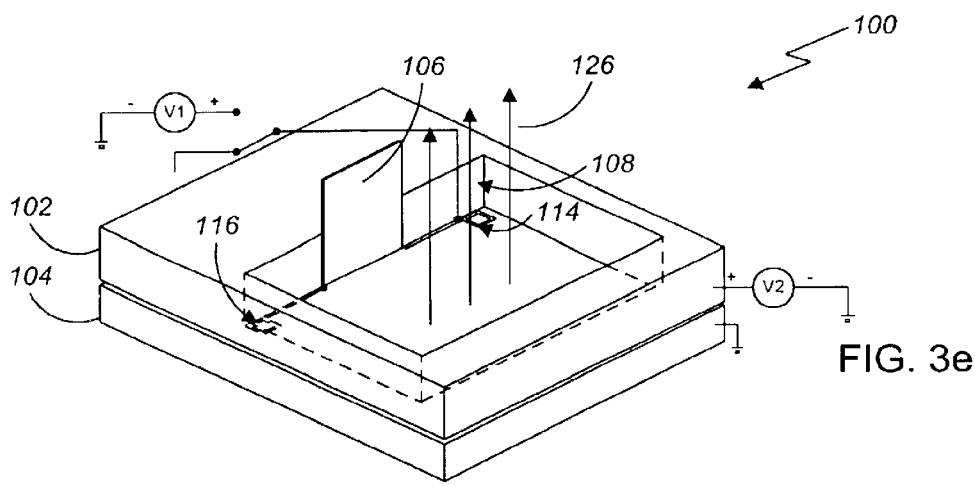
Figure 3F:
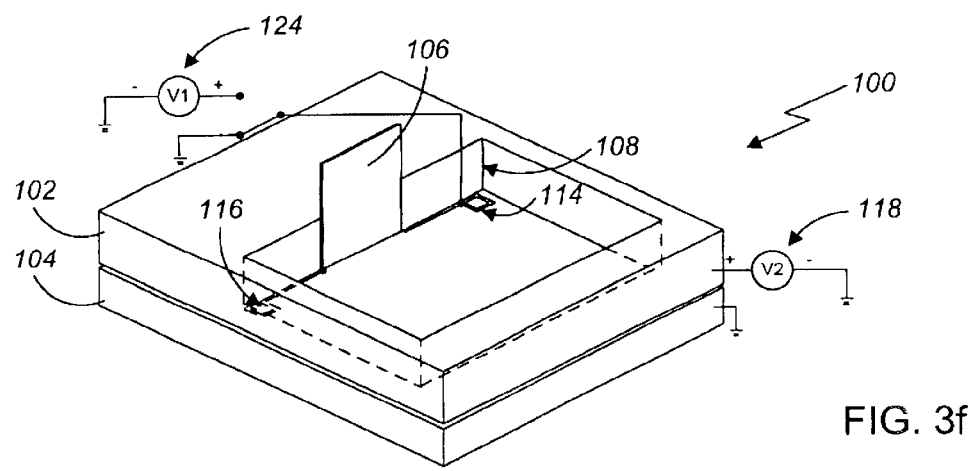

Referring to FIG. 3a, in the absence of any applied force, the plate 106 lies in the first angular orientation substantially parallel to the base 104. The voltage source 124 may be coupled to the electrostatic clamping circuit to create an electrostatic bias between the plate 106 and the base 104 upon application of a voltage V1. If a sufficient voltage V1 is applied, the plate 106 is "clamped" to the base 104 and restrains the plate 106 from rotating in the presence of an applied force, for example, a magnetic field 126 as shown in FIG. 3b. If the plate 106 is not clamped to the base 104, application of the magnetic field 126 would cause the plate 106 to be rotated about the anchors 114 and 116 between the first angular orientation and the second angular orientation until there is an equilibrium between the resultant torque from the torsional stretching of the flexures 110 and 112 and the force on the plate 106 caused by the magnetic field 126. The angular orientation of the plate 106 at the equilibrium point defines a static equilibrium position. In one implementation, the static equilibrium position is the second angular orientation, as shown in FIG. 3c. In another implementation, the static equilibrium position is between the first angular orientation and the second angular orientation, as shown in FIG. 3d. In this implementation, the force on the plate 106 resulting from the application of the magnetic field 126 can be time-varying, such that the plate 106 is provided with a momentum that rotates the plate 106 beyond the static equilibrium position to the second angular orientation. The time-varying force on the plate 106 may have a step profile, a ramp profile, a sinusoidal profile or a pulse profile. Once the plate 106 is in the second angular orientation, an electrostatic bias may be created between the plate 106 at electrical ground and the stop 102 having a voltage V2, as shown in FIG. 3e. The plate 106 clamps to the sidewall 108 in a contact area characterized by a height b and a width w provided the following condition is satisfied:

$$\frac{\varepsilon w V^2}{2g^2} \times \frac{b^2 + 2ab}{2} \geq k_\theta \theta \tag{1}$$

where $\varepsilon$ is a constant representing the permittivity of a material separating the electrically conductive portion of the plate 106 and the electrically conductive portion of the stop 102 when the plate 106 is in contact with the stop 102, V is a voltage applied to create an electrostatic bias between the plate 106 and the stop 102, g is a distance separating the electrically conductive portion of the plate 106 and the electrically conductive portion of the stop 102 when the plate 106 is in contact with the stop 102, $k_\theta$ is a torsional spring constant of the flexures 110 and 112, θ is the angular orientation of the plate 106 about the anchors 114 and 116 with respect to the first angular orientation, and a is a distance separating the stop 102 and the base 104. Once the plate 106 is clamped to the sidewall 108, removing the magnetic field 126 has no effect on the angular orientation of the plate 106, as shown in FIG. 3f.

Figure 4A:
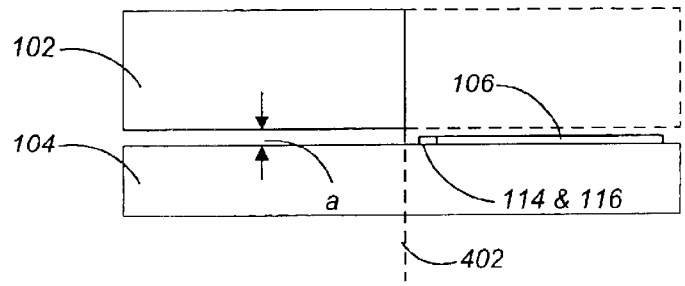
FIG. 4a is a diagrammatic side view of a movable microstructure apparatus, where a base and a stop have a slight misalignment.
Figure 4B:
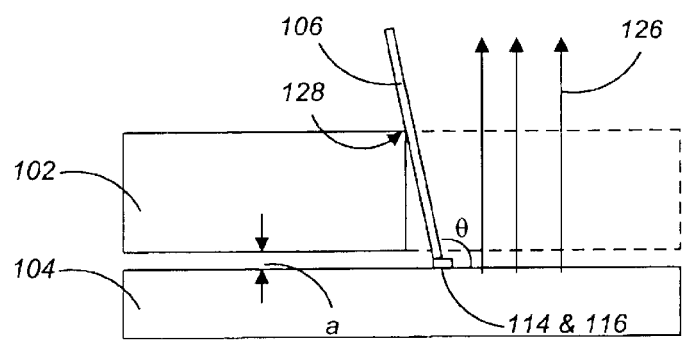
FIG. 4b is a diagrammatic side view of the movable microstructure apparatus of FIG. 4a upon application of a magnetic field.
Figure 4C:
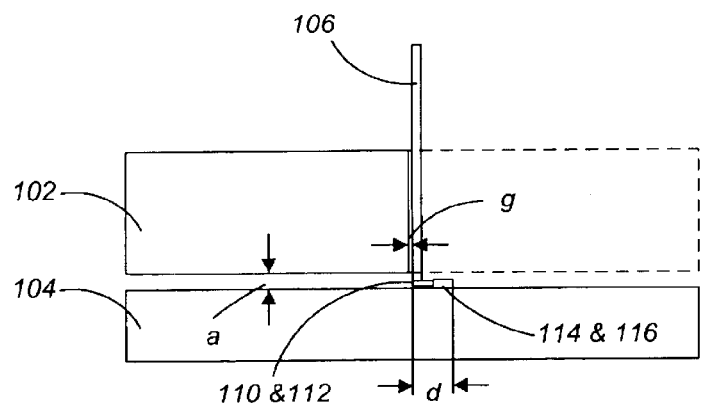
FIG. 4c is a diagrammatic side view of the movable microstructure apparatus of FIG. 4a upon application of an electrostatic bias between the plate and the stop.
Figure 4D:
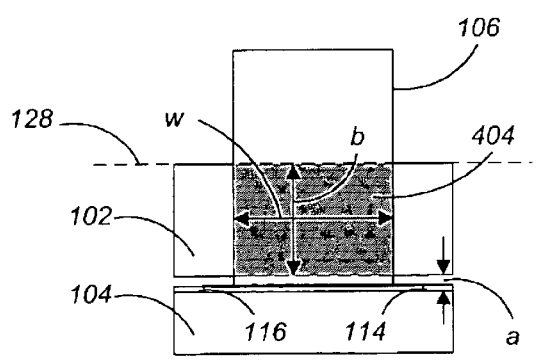
FIG. 4d is a diagrammatic front view of the movable microstructure apparatus of FIG. 4c.

FIG. 4a shows the stop 102 coupled to the base 104 with a slight misalignment. In this example, the anchors 114 and 116 are offset from a plane 402 defined through the contact area of stop 102. The plate 106 is movable through an obtuse angle e about the anchors 114 and 116 with respect to the first angular orientation. In the absence of an applied force, the plate 106 lies in the first angular orientation substantially parallel to the base 102. If the plate 106 is not clamped to the base 104, application of the magnetic field 126 may rotate the plate 106 about the anchors 114 and 116 until the plate 106 contacts a top edge 128 of the stop 102 in the second angular orientation, as shown in FIG. 4b. The plate 106 clamps to the sidewall 108 in a contact area characterized by a height b and a width was shown in FIGS. 4c and 4d provided two conditions are satisfied: (i) condition 1 defined above; and (ii) the following condition:

torque about axis defined through top edge 128 resulting from electrostatic bias created between plate 106 and stop 102 ≥ torque resulting from the lateral stretching of flexures 110 and 112

$$\frac{\varepsilon w V^2}{2g^2} \times \frac{b^2}{2} \geq kd(a+b) \quad (2)$$

where k is a lateral spring constant of the flexures 110 and 112, and d is a distance separating the location of the anchors 114 and 116 and a plane defined by the contact or overlap area 404 of the stop 102.

Figure 5A:
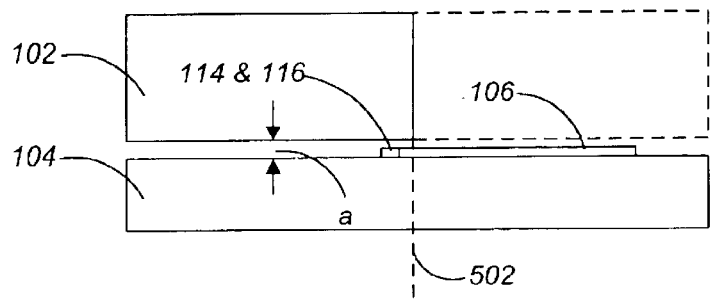
FIG. 5a is a diagrammatic side view of a movable microstructure apparatus, where a base and a stop have a slight misalignment.
Figure 5B:
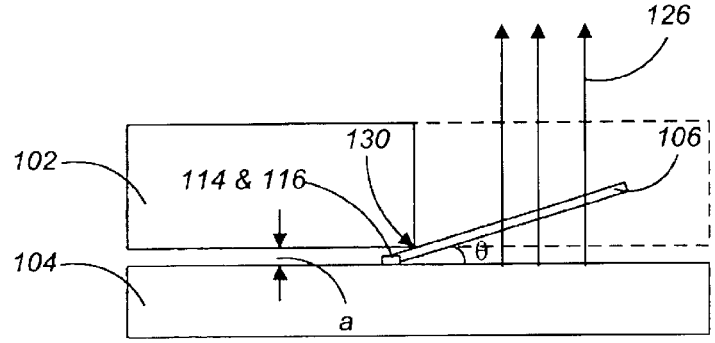
FIG. 5b is a diagrammatic side view of the movable microstructure apparatus of FIG. 5a upon application of a magnetic field.
Figure 5C:
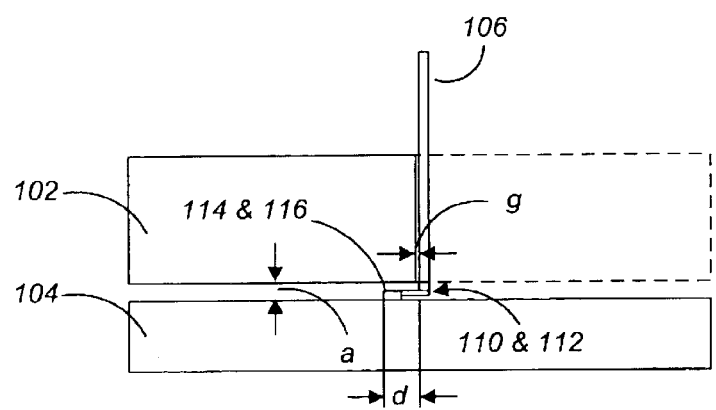
FIG. 5c is a diagrammatic side view of the movable microstructure apparatus of FIG. 5a upon application of an electrostatic bias between the plate and the stop.

FIG. 5a shows the stop 102 coupled to the base 104 with an alternative misalignment. In this example, the anchors 114 and 116 are offset from a plane 502 defined through the contact area of the stop 102. The plate 106 is movable through an acute angle θ about the anchors 114 and 116 with respect to the first angular orientation. In the absence of an applied force, the plate 106 lies in the first angular orientation substantially parallel to the base 102. If the plate 106 is not clamped to the base 104, application of the magnetic field 126 may rotate the plate 106 about the anchors 114 and 116 until the plate 106 contacts a bottom edge 130 of the stop 102 in the second angular orientation, as shown in FIG. 5b. The plate 106 clamps to the sidewall 108 in a contact area characterized by a height b and a width w as shown in FIG. 5c provided two conditions are satisfied: (i) condition 1 defined above; and (ii) the following condition:

torque about axis defined through bottom edge 130 resulting from electrostatic bias created between plate 106 and stop 102 ≥ torque resulting from the lateral stretching of flexures 110 and 112

$$\frac{\varepsilon w V^2}{2g^2} \times \frac{b^2}{2} \geq kda \quad (3)$$

In the three cases described above and shown in FIGS. 3f, 4c and 5c, in the absence of an applied force, the plate 106 returns to the first angular orientation substantially parallel to the base 104 as the torsional and lateral stretching of the flexures 110 and 112 are relaxed.

Figure 6A:
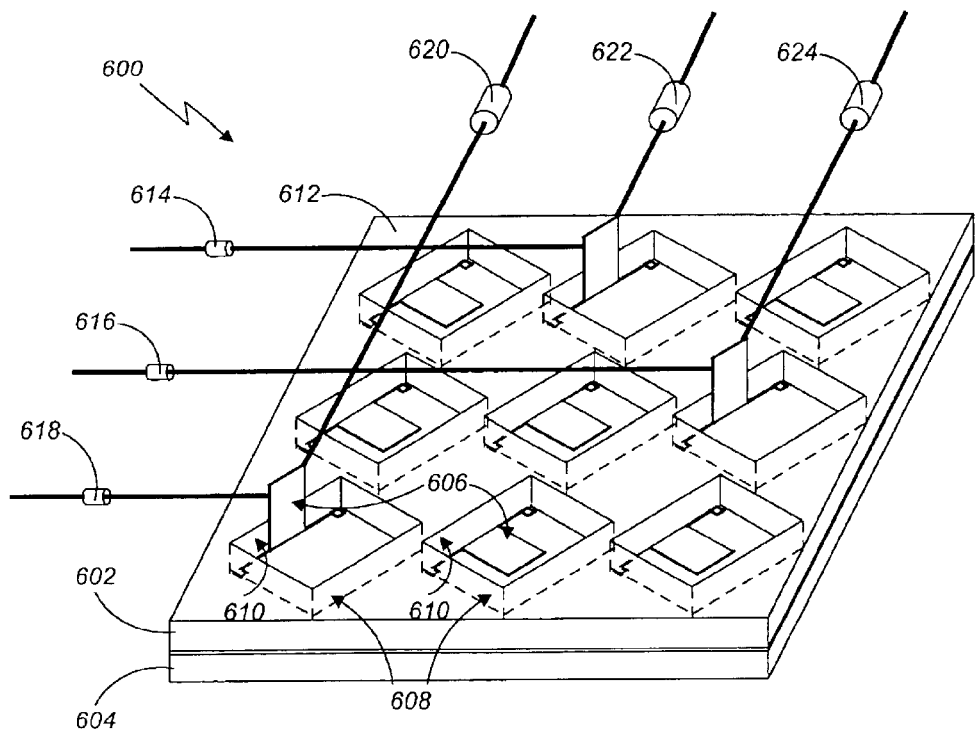
FIG. 6a is a diagrammatic perspective view of an N×M system movable microstructure apparatus used as an optical switch.
Figure 6B:
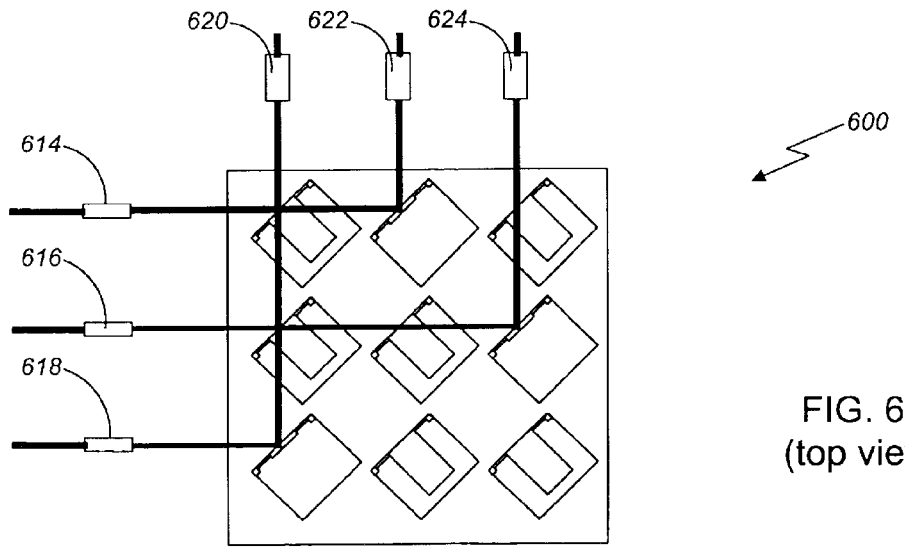

FIGS. 6a and 6b show an apparatus 600 having a stop assembly 602 coupled to a base assembly 604. The base assembly 604 has an array of plates 606. Each plate is coupled to the base assembly 604 by at least one flexure which permits each plate to change its angular orientation and lateral position. The stop assembly 602 may have an array of substantially planar surfaces. Each substantially planar surface may be configured to contact a respective plate in a contact area sized so that, upon application of a force to the plate substantially normal to the substantially planar surface of the stop assembly 602, a sufficient force holds the plate against the stop assembly 602 in a plane substantially parallel to the substantially planar surface of the stop assembly 602. In one implementation, the stop assembly 602 defines an array of apertures 608, as shown in FIG. 6a. Each aperture has at least one substantially planar surface 610 that contacts a respective plate in a contact area. Each substantially planar surface 610 is constructed to lie in a plane normal to the base assembly 604. The array of plates 606 may be coupled to an electrostatic clamping circuit such that each plate may be individually selected to be clamped to its respective surface 610 or to the base assembly 604. In an alternative implementation (not shown), the stop assembly may define an array of cavities, each cavity having at least one substantially planar surface that contacts a respective plate in a contact area.

One application of the apparatus 600 is an optical switch. In one implementation, the array of plates 606 act as reflectors. A suitable reflector coating may be deposited on the portion of each plate above the plane of a top surface 612 of the stop assembly 602 to enhance reflectivity if desired. In an alternative implementation, the array of plates 606 act as beam splitters. Each plate may be constructed from a material that transmits and reflects different parts of an optical beam. Each plate may be similarly sized and constructed such that each sidewall 610 contacts a bottom portion of its respective plate.

FIG. 6a shows the apparatus 600 having three optical inputs 614, 616 and 618, and three optical outputs 620, 622 and 624. The N inputs (614, 616 and 618) are along one side of the apparatus 600 and the M outputs (620, 622 and 624) are along an adjacent side. The switching elements are the array of plates 606. Each plate is oriented at a similar angle, for example, 45 degrees to an incoming optical beam. If the mth plate along one of the N input beams is clamped to its respective sidewall, that beam is reflected into the mth of the M outputs. All but one plate in a given input line may be held down by the electrostatic bias applied between the plate and the base assembly 604. The plate that is clamped to its respective sidewall selects the output for that input line.

The materials from which the apparatus 600 is fabricated, the voltage sources, the applied electrostatic bias, and the applied magnetic fields may be chosen by a user to adjust the sensitivity of the apparatus 600 for any particular purpose or application. The apparatus 600 may be fabricated using techniques including "lithographic, galvanoformung and abformung" (LIGA), traditional machining, deep anisotropic plasma etching and laser machining. The stop assembly 602 may be fabricated by anisotropic etching of (110)-oriented silicon which ensures the angular uniformity of all the sidewalls 610 on the stop assembly 602. The array of plates 606, sidewalls 610 and the base assembly 604 may be fabricated to have textured surfaces on one or more surfaces to reduce sticking when a plate is clamped to its respective sidewall or to the base assembly 604. The textured surface may include dimples, bumps, and ridges such that the contact area may include the overlap area between the plate and the stop at a distance gap generally equal to the effective height of the texture. The number of plates defining the N-by-M array of plates 606 may be adjusted based on the application of the apparatus 600. The apparatus 600 may be fabricated in a single batch-process and consist of a single stop-base module. Alternatively, the apparatus 600 may be fabricated in a two-part process, one process for fabricating the stop assembly 602 and the other process for fabricating the base assembly 604. The stop assembly 602 may be aligned with the base assembly 604 in a separate alignment step.

The applied electrostatic bias may be an attractive force applied by the electrostatic clamping circuit described above or by other means, where the attractive force is defined as any force that pushes or pulls a plate towards a stop.

Figure 7A:
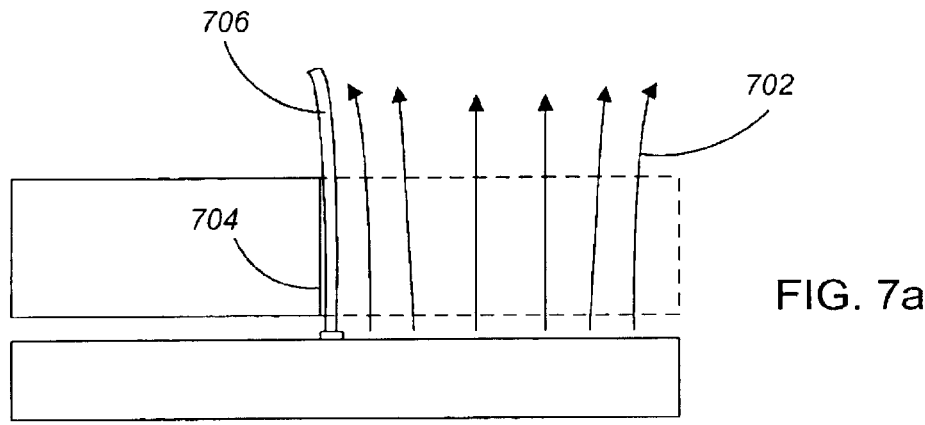
FIG. 7a is a diagrammatic side view of the movable microstructure apparatus of FIG. 1 upon application of a magnetic field, where the magnetic field is not parallel to a sidewall of a stop.
Figure 7B:
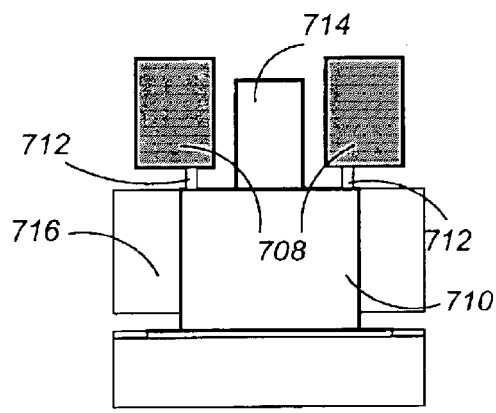
FIG. 7b is a diagrammatic front view of an alternate embodiment of a movable microstructure apparatus.
Figure 7C:
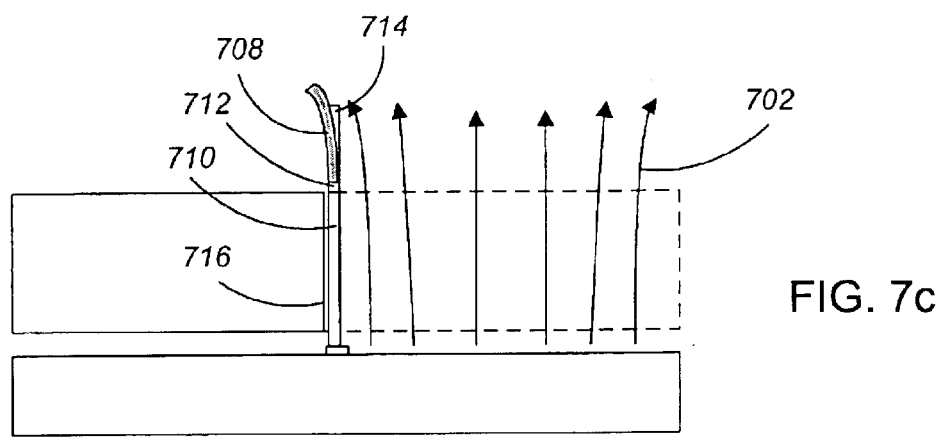
FIG. 7c is a diagrammatic side view of the movable microstructure apparatus of FIG. 7b upon application of a magnetic field, where the magnetic field is not parallel to a sidewall of a stop.

The magnetic fields may be applied using coils located internal or external to the apparatus 600, or a permanent magnet located internal or external to the apparatus 600. Current-carrying coils, hard magnetic materials, soft magnetic materials, or a combination of the three formed on each of the array of plates 606 may apply a force to the plate in the presence of magnetic fields. An applied magnetic field 702 that is not perfectly parallel to the sidewall 704 may induce a slight torque and resultant bending in the portion of the plate 706 containing a reflective surface when the plate 706 is clamped to the sidewall 704, as shown in FIG. 7a. The resultant bending may cause a misalignment of a reflected beam. FIG. 7b shows an alternative implementation to the plate 706 that reduces the bending effects on optical performance. The magnetic portion 708 of the plate 710 is connected to the rest of the plate 710 by support arms 712. The support arms 712 isolate the portion of the plate 710 containing a reflective surface 714 from the magnetic field 702 that is applied on the magnetic portion 708 of the plate 710. In this implementation, when the plate 710 is clamped to the sidewall 716, application of the magnetic field 702 that is not perfectly parallel to the sidewall 716 results in minimal bending in the portion of the plate 710 containing the reflective surface 714 as shown in FIG. 7c.

The invention has been described in terms of particular embodiments. Other embodiments are within the scope of the following claims. For example, the steps of the invention can be performed in a different order and still achieve desireable results.

What is claimed is:

1. An apparatus, comprising:
   a base;
   a plate having a bottom portion coupled to a top surface of the base so that the plate is movable between a first angular orientation adjacent to the top surface of the base and a second angular orientation away from the base; and
   a stop positioned above the top surface of the base, the stop has an aperture and a portion of a sidewall of the aperture contacts the plate in a contact area when the plate is in the second angular orientation and the stop is further configured to prevent the plate from rotating beyond the second angular orientation.

2. An apparatus, comprising:
   a base;
   a plate coupled to a top surface of the base and movable between a first angular orientation adjacent to the top surface of the base and a second angular orientation away from the base; and
   a stop positioned above the top surface of the base, wherein the stop has an aperture and a portion of a sidewall of the aperture contacts the plate in a contact area sized so that, upon application of an electrostatic bias between the plate and the stop, a sufficient force holds the plate against the stop, the stop preventing the plate from rotating beyond the second orientation.

3. The apparatus of claim 1 or 2, wherein the plate is coupled to the base at an anchor location.

4. The apparatus of claim 3, wherein the plate is coupled to the base through a flexure.

5. The apparatus of claim 4, wherein the flexure is formed from a flexible and resilient material accommodating changes in:
   the angular orientation of the plate about the anchor location with respect to the first angular orientation; and
   a lateral position of the plate with respect to the anchor location.

6. The apparatus of claim 5, wherein the plate and the stop each comprises a respective electrically conductive portion.

7. The apparatus of claim 6, wherein:
   upon application of a magnetic field, the plate moves to the second angular orientation and contacts the stop in a contact area characterized by a height b and a width w that effectively satisfies the following condition:

$$\frac{\varepsilon w V^2}{2g^2} \times \frac{b^2 + 2ab}{2} \geq k_\theta \theta$$

where $\varepsilon$ is a constant representing the permittivity of a material separating the electrically conductive portion of the plate and the electrically conductive portion of the stop when the plate is in contact with the stop, V is a voltage applied to create an electrostatic bias between the plate and the stop, g is a distance separating the electrically conductive portion of the plate and the electrically conductive portion of the stop when the plate is in contact with the stop, $k_\theta$ is a torsional spring constant of the flexure, $\theta$ is the angular orientation of the plate about the anchor location with respect to the first angular orientation, and a is a distance separating the stop and the base.

8. The apparatus of claim 7, wherein the plate contacts the stop in a contact area characterized by a height b and a width w that further satisfies the following condition when the second angular orientation is an obtuse angle about the anchor location with respect to the first angular orientation:

$$\frac{\varepsilon w V^2}{2g^2} \times \frac{b^2}{2} \geq kd(a+b)$$

where k is a lateral spring constant of the flexure, and d is a distance separating the anchor location and a plane defined by the contact area of the stop.

9. The apparatus of claim 7, wherein the plate contacts the stop in a contact area characterized by a height b and a width w that further satisfies the following condition when the second angular orientation is an acute angle about the anchor location with respect to the first angular orientation:

$$\frac{\varepsilon w V^2}{2g^2} \times \frac{b^2}{2} \geq kda$$

where k is a lateral spring constant of the flexure, and d is a distance separating the anchor location and a plane defined by the contact area of the stop.

10. The apparatus of claim 5, wherein the flexure is formed from polycrystalline-silicon.

11. The apparatus of claim 1, wherein the contact area comprises a substantially planar surface configured to define a lateral position of the plate with respect to an anchor location and the second angular orientation of the plate about the anchor location with respect to the first angular orientation when a force is applied between the plate and the stop.

12. The apparatus of claim 11, wherein the substantially planar surface of the contact area is substantially perpendicular to the top surface of the base.

13. The apparatus of claim 11, wherein the force is an electrostatic force.

14. The apparatus of claim 1 or 2, wherein the base, the plate and the stop are formed from a semiconductor material.

15. The apparatus of claim 1 or 2, wherein the plate comprises a current-carrying coil.

16. The apparatus of claim 1 or 2, wherein the plate comprises a hard magnetic material.

17. The apparatus of claim 1 or 2, wherein the plate comprises a soft magnetic material.

18. The apparatus of claim 1 or 2, wherein the plate comprises a light-reflecting surface.

19. The apparatus of claim 1 or 2, wherein the plate is one of an array of plates coupled to the base, each plate having a respective stop configured to contact the plate in a contact area.

20. An apparatus comprising:
a base;
a plate coupled to a top surface of the base and movable between a first position adjacent to the top surface of the base and a second position away from the base; and
a stop positioned above the top surface of the base, the stop has an aperture and a substantially planar surface of a sidewall of the aperture contacts of the plate in a contact area sized so that, upon application of a force to the plate substantially normal to the substantially planar surface of the stop, a sufficient force holds the plate against the stop such that the plate lies in a plane substantially parallel to the substantially planar surface of the stop such that the stop prevents the plate from rotating beyond the second position.

21. The apparatus of claim 20, wherein the plate is coupled to the base at an anchor location.

22. The apparatus of claim 21, wherein the plate is coupled to the base through a flexure.

23. The apparatus of claim 22, wherein the flexure is formed from a flexible and resilient material accommodating changes in:
an angular orientation of the plate about the anchor location with respect to the first position; and
a lateral position of the plate with respect to the anchor location.

24. The apparatus of claim 23, wherein the flexure is formed from polycrystalline-silicon.

25. The apparatus of claim 20, wherein the substantially planar surface is substantially perpendicular to a top surface of the base.

26. The apparatus of claim 20, wherein the base, the plate and the stop are formed from a semiconductor material.

27. The apparatus of claim 20, wherein the plate comprises a current-carrying coil.

28. The apparatus of claim 20, wherein the plate comprises a hard magnetic material.

29. The apparatus of claim 20, wherein the plate comprises a soft magnetic material.

30. The apparatus of claim 20, wherein the plate comprises a light-reflecting surface.

31. The apparatus of claim 20, wherein the plate is one of an array of plates coupled to the base, each plate having a respective aperture including a substantially planar surface of a sidewall configured to contact the plate in a contact area.

32. The apparatus of claim 4 wherein the flexure is electrically conductive.

33. The apparatus of claim 32 wherein the flexure enables the plate to return to the first angular orientation from the second angular orientation.

34. The apparatus of claim 22 wherein the flexure is electrically conductive.

35. The apparatus of claim 34 wherein the flexure enables the plate to return to the first position from the second position.

36. The apparatus of claim 1 or 2, wherein at least one of the plate, the base and the stop has a textured surface.

37. An apparatus, comprising:
a base;
a plate having a bottom portion coupled to a top surface the base so that the plate is movable between a first angular orientation adjacent to the top surface of the base and a second angular orientation away from the base, the plate having a magnetic portion that is separate from a reflective surface of the plate to reduce any bending of the reflective surface caused by an applied magnetic field; and
a stop positioned above the top surface of the base, the stop has an aperture and a portion of a sidewall of the aperture contacts the plate in a contact area when the plate is in the second angular orientation and the stop is further configured to stop the plate from rotating beyond the second angular orientation.

38. The apparatus of claim 1, wherein:
the stop is immobile.

39. The apparatus of claim 2, wherein:
the stop is immobile.

40. The apparatus of claim 20, wherein:
the stop is immobile.

41. The apparatus of claim 37, wherein:
the stop is immobile.

42. The apparatus of claim 2, wherein:
at least one of the stop is substantially perpendicular to the top surface of the base.

43. The apparatus of claim 37, wherein:
at least one surface of the stop is substantially perpendicular to the top surface of the base.

* * * * *